Nov. 28, 1961   C. C. BARBER   3,010,462
PORTABLE CABINS

Filed Dec. 23, 1958   2 Sheets-Sheet 1

INVENTOR
Charles Clifford Barber
By
Watson, Cole, Grindle & Watson
ATTORNEYS

Nov. 28, 1961     C. C. BARBER     3,010,462
PORTABLE CABINS

Filed Dec. 23, 1958     2 Sheets-Sheet 2

INVENTOR
Charles Clifford Barber
By
Watson, Cole, Grindle & Watson
ATTORNEYS

_United States Patent Office_ 3,010,462
Patented Nov. 28, 1961

3,010,462
PORTABLE CABINS
Charles C. Barber, P.O. Box 49, Crown Mines, Johannesburg, Transvaal, Union of South Africa, assignor of one-half to George Holland Strock, Johannesburg, Transvaal, Union of South Africa
Filed Dec. 23, 1958, Ser. No. 782,559
Claims priority, application Union of South Africa
Jan. 15, 1958
2 Claims. (Cl. 135—1)

This invention relates to portable cabins or huts and more particularly to cabins which are suitable as camping, picnic or holiday shelters.

Generally camping shelters are either in the form of a tent or caravan. The former while being readily transported is not a very rigid construction or easily erected and the latter is cumbersome and expensive. Types of collapsible cabins have been developed but in general suffer from the disadvantages of either or both the above mentioned inconveniences and are generally relatively complicated structures for their purposes.

It is the object of this invention to provide a portable cabin or hut which while being easily transported and simply erected will also be of robust and rigid construction.

According to this invention there is provided a portable cabin adapted to be mounted on the roof of an automobile comprising a rigid lightweight roof structure with collapsible supporting frames and walls stowed in or around the roof structure, the supporting frames adapted to be withdrawn from the roof structure while it is on the roof of the automobile and installed successively at the respective ends of the roof structure. Thus, the arrangement will be very quickly set up while the erector never has to lift the full weight of the roof since a portion thereof is always resting upon either a pair of the legs or supporting frames, or the carrier upon the roof of the car.

Further features of this invention provide for the supporting frames to be either poles, rigid or telescopic; or for the side walls of the cabin; for the walls not forming supporting frames to be made from sheets of flexible material and adapted to be secured to the adjoining sides at the corners.

The invention further provides for the roof structure to incorporate at least one shelf for the storage of camp stretchers and bedding and for guy ropes which may be used to secure the erected cabin against high winds or to secure the dismantled cabin in position on the automobile roof.

Figure 1:
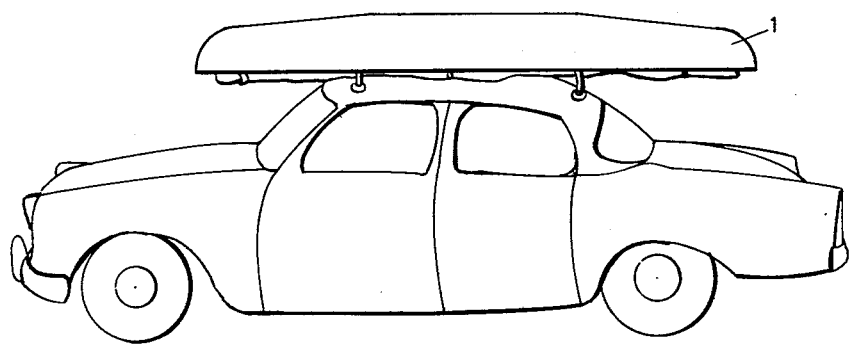
Figure 2:
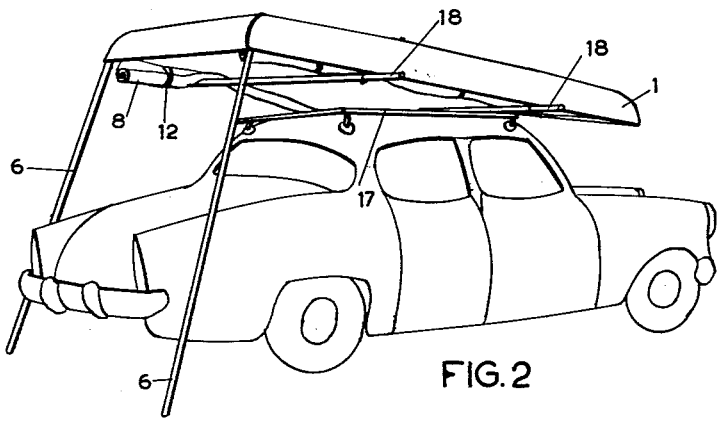
Figure 3:
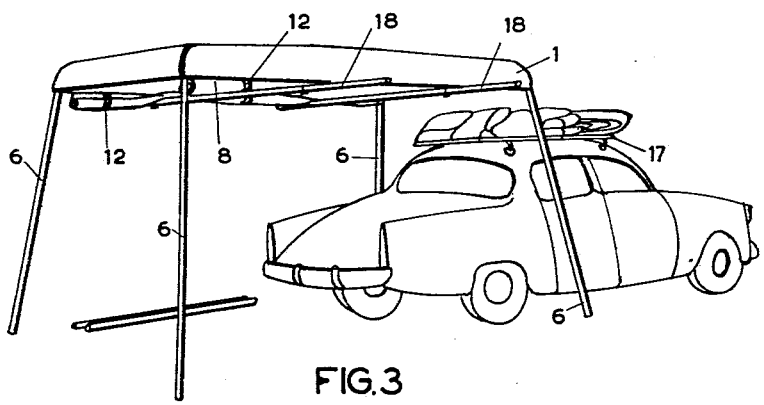
Figure 4:
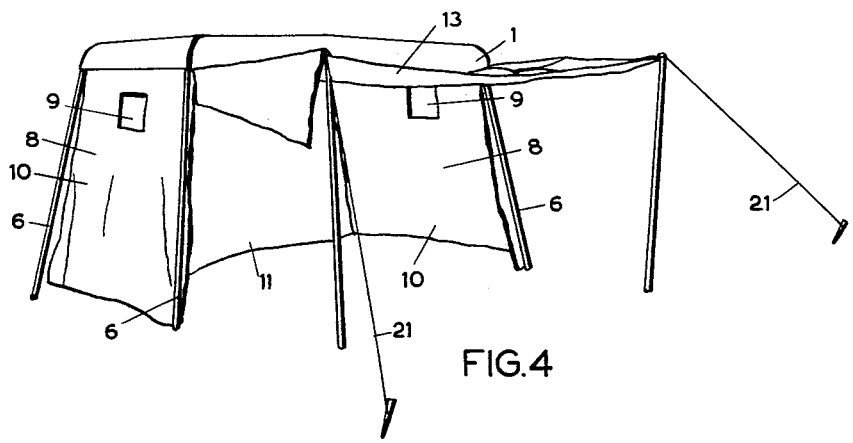
Figure 5:
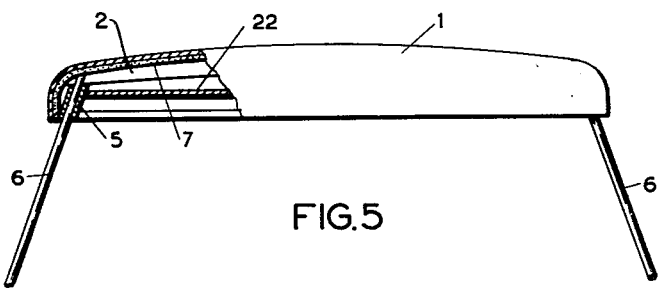
Figure 6:
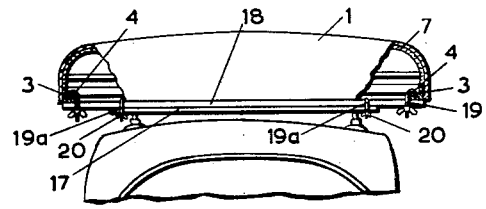

The accompanying drawings illustrate preferred embodiments and:

FIG. 1 shows the cabin in position for transit,
FIGS. 2, 3 and 4 show various positions during erection of the cabin,
FIG. 5 is a detail of support connection to the roof structure, and
FIG. 6 is a detail showing the means for securing the cabin to the roof of an automobile.

In the form illustrated the portable cabin has a lightweight aluminium roof structure 1 made from sheeting secured to a suitable bracing framework 2 and has downwardly bent edges. Portion of this framework 2 is in the form of a peripheral rib 3 having an inner upwardly bent lip 4 and the rib 3 is secured to the edges of the roof structure which are bent downwardly. The roof structure 1 is preferably of slightly convex shape when viewed from the outside and is made to a size slightly wider than the width of the automobile on which it is to be carried.

Built into each corner of the roof structure 1 is a socket 5 adapted to retain the end of a tubular support 6. The sockets 5 are inclined outwardly so that the base of the erected cabin will be larger than the area of the roof structure 1.

A lining 7 of foamed plastic rubber or other insulating material is suitably applied to and retained on the interior of the roof structure and may be coloured as desired. This lining 7 will prevent condensation of moisture on the inside of the roof structure 1 when the cabin is in use at night or other periods when ambient conditions would normally result in such condensation on the cold metal surface. The polished outer surface of the roof structure will reflect heat and help to keep the cabin cool under hot conditions.

The side walls 8 of the cabin may be made of folded material such as plastic or canvas sheeting and transparent windows 9 may be made in any or all of the walls. To facilitate erection of the cabin the two end walls 10 and rear wall 11 will be made as one piece with the wall 11 permanently secured along its upper edge to the roof structure 1 while the corresponding edges of the end walls 10 may be releasably attached to the lip 4 of rib 3 along the ends of the roof structure. The sheet material will of course be shaped to allow for the outward splaying of the tubular supports 6 and the lower ends of the walls may be either secured to the bottom of the supports 6 or pegged to the ground. By detaching the end walls 10 and folding them inwardly along the rear wall 11 the sheet may be rolled up under the roof structure and be retained by suitable straps 12 under the edge of the roof structure. Straps 12 may also be used to retain the supports 6 along the roof structure during transportation of the cabin.

The front wall 13 will be separate and may be raised and supported as shown in FIG. 4 to give an increased covered area or lowered to form complete closure of the cabin when desired.

To hold the cabin in its collapsed position on the roof of an automobile a roof carrier 17 of the usual type is provided and fitted to the automobile roof in the usual manner. Since camping equipment is generally heavier than the usual articles carried on a roof carrier a special roof carrier may be used if this is desirable. Particularly the rubber feet of the carrier will be made larger to distribute the weight carried over a larger area of the roof. Two supporting members 18 which project laterally on either side of the carrier 17 are secured releasably to the latter. The rib 3 rests on the members 18 and hook bolts 19 co-operate with the lip 4 on rib 3 and the members 18 to hold the roof structures and folded or retracted side walls 8 in position. Further hook bolts 19a are used to hold the members 18 onto the carrier 17. The use of wing nuts 20 enables the cabin to be easily released from the carrier 17.

The roof structure 1 of the cabin is thus supported clear of the carrier 17 and will provide protection for articles placed on the carrier 17 during transit.

To erect the cabin all that is required is for the hook bolts 19a to be released and the supports 6 withdrawn from the straps 12. One end of the roof is then raised and the supports 6 inserted into the socket 5 at this end. The procedure is then repeated at the other end and the automobile may be driven from under the roof structure 1. Thus, the operator never has to lift the full weight of the cabin roof since a portion thereof will always be resting upon either the pair of supporting legs or members 6 or by the car itself. The hook bolts 19 are then released and members 18 removed to enable the walls to be lowered and secured as above described to complete the cabin.

The cabin is of a convenient height and the rigid roof structure affords excellent protection from the elements. The members 18 removed from structure 1 may be used to support the opened front wall 13 as shown in FIG. 4 but guy ropes 21 will also be necessary. To dismantle the cabin the operations above mentioned are reversed.

It will of course be understood that the support may be suitably hinged to the roof structure where the attendant expense in manufacture is warranted. Means will in this case be provided to lock the hinges when the supports are operatively positioned.

The roof structure may be made of other material such as moulded fibreglass, suitable plastic or light gauge steel sheet and storage shelves 22 may be built into the structure 1 if desired. The shelves may be hinged to the inside of the roof structure 1 if desired and pivoted hanging rods may also be provided.

What I claim as new and desire to secure by Letters Patent is:

1. A portable cabin for habitation, adapted to be transported in knock-down form upon the roof of an automobile and to be completely separated therefrom when in condition for use, said cabin comprising a rigid lightweight roof structure of approximately the width of the automobile and having downwardly bent edges, said roof structure being provided around its lower end with an inwardly upwardly lipped rib, quick detachable means cooperable with said rib for readily detachably securing said cabin roof structure to the roof of the automobile for easy separation of the former from the latter in an upward direction, a plurality of collapsible poles for supporting said cabin roof structure directly from the ground surface independently of said automobile, said roof structure being provided with sockets at each corner thereof into which said poles are inserted, said poles being longer than the height of the automobile, whereby when said poles are extended with their outer ends resting upon the ground and with the quick detachable means unfastened, the cabin roof structure is raised and supported from the ground clear of contact with the automobile roof so that the automobile may be driven from under the cabin roof structure, side wall enclosure means also secured to the cabin roof structure and adapted to extend to the ground, and means within the roof structure for stowing said support members and side wall enclosure means when not in use.

2. A portable cabin as set forth in claim 1, in which a roof carrier having two laterally projecting members substantially equal in length to the width of the roof structure is provided, hook bolts adapted to cooperate with the rib and projecting members, and further hook bolts adapted to cooperate with the projecting members and the roof carrier, the assembly forming quick detachable means for retaining the cabin in position on the roof of the automobile.

References Cited in the file of this patent

UNITED STATES PATENTS

| | | |
|---|---|---|
| 1,623,507 | Thurtle | Apr. 5, 1927 |
| 1,871,871 | Woods | Aug. 16, 1932 |
| 2,144,747 | Adams | Jan. 24, 1939 |
| 2,533,683 | Neuhaus | Dec. 12, 1950 |
| 2,696,825 | Lamb | Dec. 14, 1954 |
| 2,835,262 | Collins | May 20, 1958 |